United States Patent [19]

Shultz

[11] Patent Number: 5,378,095
[45] Date of Patent: Jan. 3, 1995

[54] LOAD SECURING DEVICE FOR TRUCKS

[76] Inventor: Cormey Shultz, Rte. 1, Box 72, Dutch Valley Rd., Lake City, Tenn. 37769

[21] Appl. No.: 54,188

[22] Filed: Apr. 28, 1993

[51] Int. Cl.$^6$ .................. B60P 7/15; B61D 45/00
[52] U.S. Cl. ........................... 410/151; 410/143
[58] Field of Search ............... 410/143-149, 410/151, 128; 74/141.5, 142, 155, 169; 254/12, 95, 108, 230, 247

[56] References Cited

U.S. PATENT DOCUMENTS

| | | | |
|---|---|---|---|
| 923,463 | 6/1909 | Taylor | 410/151 |
| 1,135,299 | 4/1915 | Larsen | 254/95 X |
| 1,951,660 | 3/1934 | Klaudt | . |
| 2,612,848 | 10/1952 | Sowden | 410/151 |
| 3,049,328 | 8/1962 | Bishop | 410/151 X |
| 4,343,578 | 8/1982 | Barnes | 410/151 |
| 4,432,678 | 2/1984 | Liebel | 410/151 |
| 4,473,331 | 9/1984 | Wisecarver | 410/129 |
| 4,669,934 | 6/1987 | Wisecarver | 410/151 |
| 4,781,499 | 11/1988 | Wisecarver | 410/151 |
| 5,028,185 | 7/1991 | Shannon | 410/151 |
| 5,094,576 | 3/1992 | Fredelius | 410/151 |
| 5,192,187 | 3/1993 | Sweet | 410/151 |

Primary Examiner—Michael S. Huppert
Assistant Examiner—Stephen Gordon
Attorney, Agent, or Firm—Pitts & Brittian

[57] ABSTRACT

A load securing device for holding cargo within trucks against shifting during motion of the truck. The device is considered to be a "load lock" in that it extends from one side wall of the truck to the other, being installed against the surface defined by the cargo. The device has telescoping rods such that a gross overall length can be preset, this length being less than that dimension of the truck. Final adjustment of the length is provided through the use of a pinion gear engaged with a rack. The pinion gear is a complete circle, and the rack has a length at least sufficient to accommodate such a complete revolution of the pinion gear. A handle is provided to achieve rotation of the pinion gear, and a toothed wheel and cog are used to maintain the position of the pinion-rack engagement when the device is firmly in place within the truck. The device is easily removed by disengaging the cog, and rotating the pinion gear in the opposite direction. No springs are utilized in the mechanism for final adjustment of length, and the structure is sufficiently rugged so as to withstand considerable abuse.

16 Claims, 2 Drawing Sheets

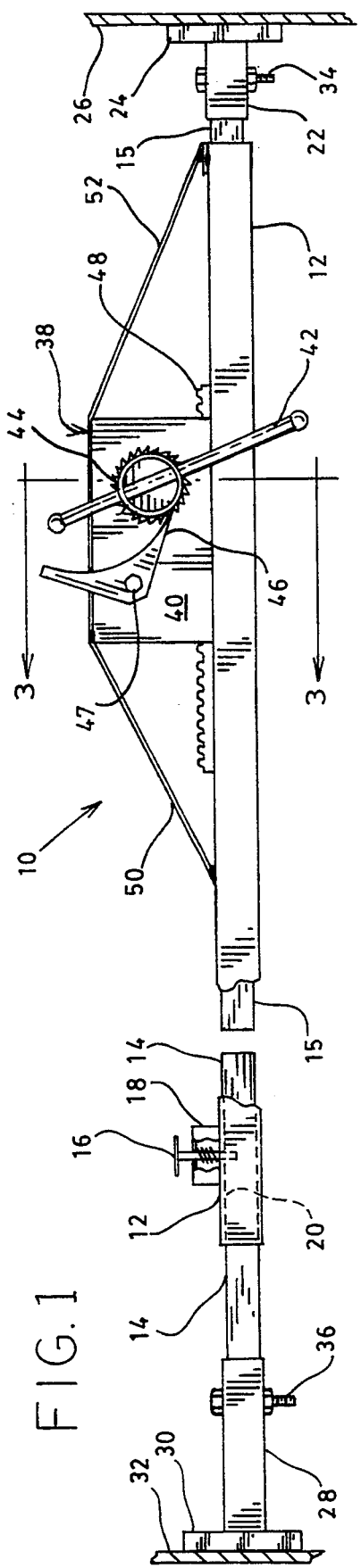
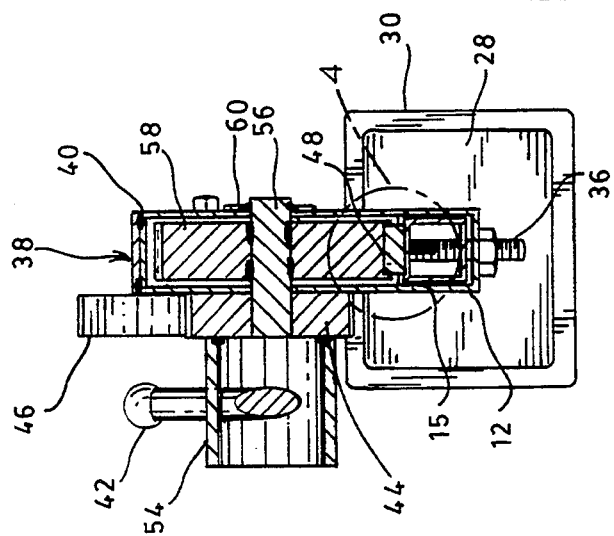
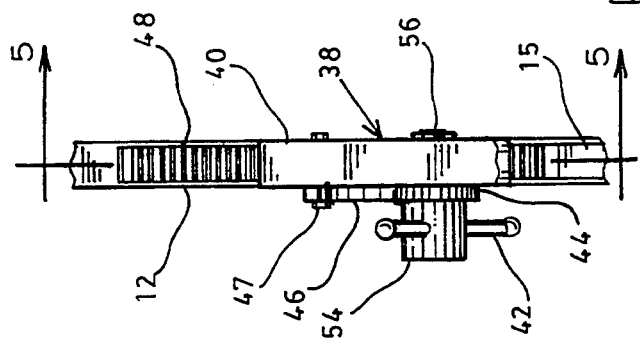

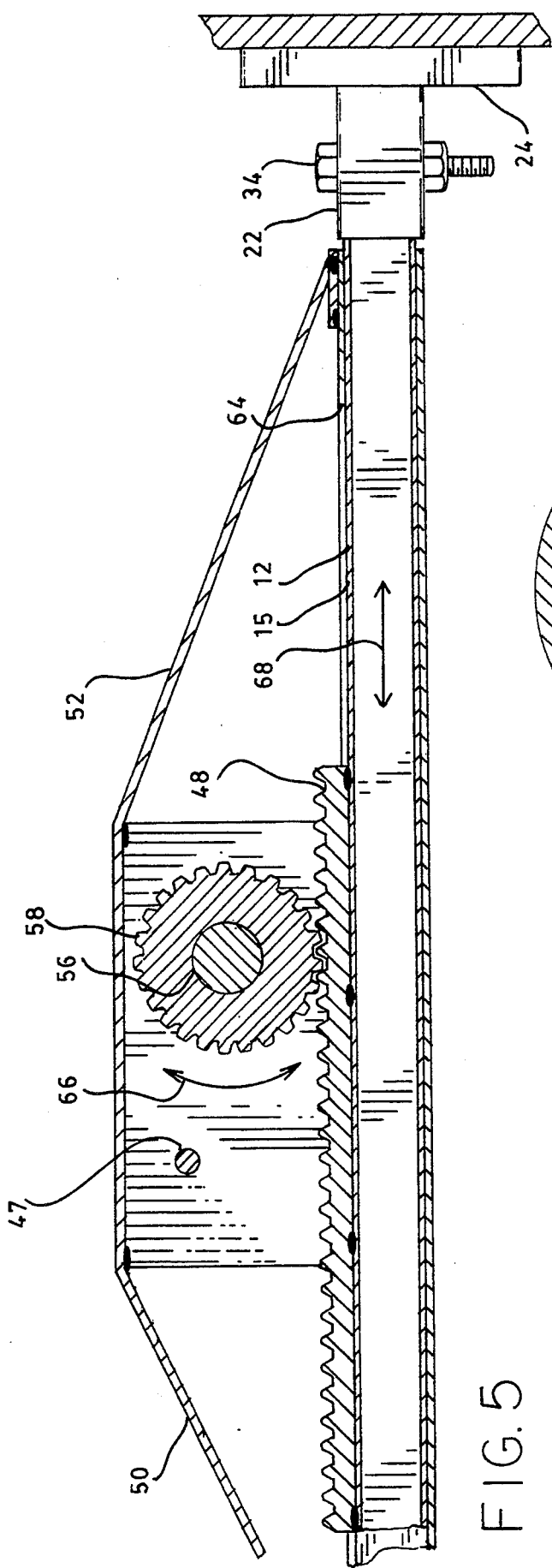
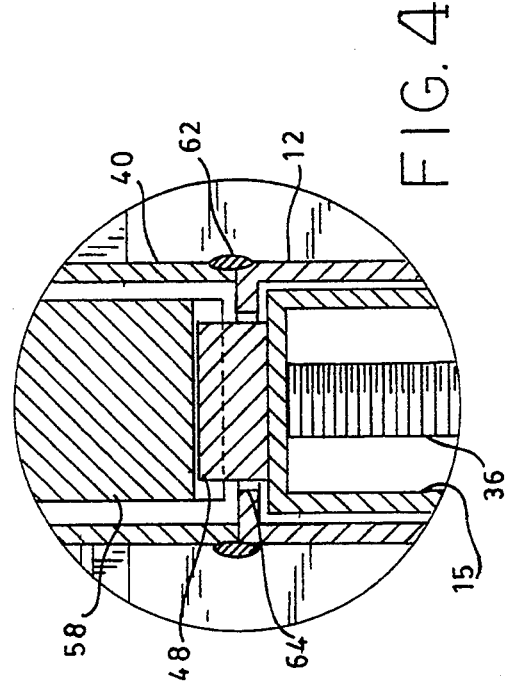

1

LOAD SECURING DEVICE FOR TRUCKS

TECHNICAL FIELD

The present invention relates to retaining devices to prevent the shifting of loads within an enclosed space, and more particularly to an easily adjusted and durable load securing device for use in transport trucks to prevent shifting of the load while the truck is in transport.

BACKGROUND ART

Cargo within trucks, unless it substantially fills the space, tends to shift position due to acceleration, deceleration and/or vibration. Typically freight line trucks are not completely filled, thus giving rise to the shifting problem. Vans used for moving typically utilize webbed belts to fix the cargo in space and, since there is usually no need for rearranging the load between the loading location and the ultimate destination, the load remains in a fixed position. However, in trucks where there are relatively frequent stops, with a part of the cargo removed each time, some more convenient form of load securing devices are required.

Extendable bracing bars are well known in the art of load bracing in the trucking industry. Many of the devices designed for this purpose provide for a gross adjustment of length by having an extendable bar, and then the minor adjustment is accomplished by some type of jacking and latching mechanism. Typical of the devices that have been developed are described in U.S. Pat. Numbers: U.S. Pat. No. 1,951,660 issued to H. Klaudt on Mar. 20, 1934; U.S. Pat. No. 4,343,578 issued to B. Barnes on Aug. 10, 1982; U.S. Pat. No. 4,432,678 issued to H. Liebel on Feb. 21, 1984; U.S. Pat. No. 4,473,331 issued to M. Wisecarver on Sep. 25, 1984; U.S. Pat. No. 4,669,934 issued to W. Wisecarver on Jun. 2, 1987; U.S. Pat. No. 4,781,499 issued to W. Wisecarver on Nov. 1, 1988; U.S. Pat. No. 5,028,185 issued to P. Shannon on Jul. 2, 1991; and U.S. Pat. No. 5,094,576 issued to C. Fredelius on Mar. 10, 1992. In the '934, '499 and '576 patents a rack-type gear is used in conjunction with a pinion gear having teeth only on a portion of the periphery. This construction limits the final adjustment of the total length to the extension provided by these gear components to about one inch. If total travel has initially been utilized, should the load restrainer become loose, the only source of length change is in the bar itself, with again adjusting the gear portions. Truck wall vibration can often exceed one inch. Other of the devices shown in the above-listed patents are useful only for light loads, such as those in a pickup truck. Most all utilize some form of spring that will not withstand hard usage.

A further load "lock" that is commonly utilized is essentially a ratcheting bumper jack attached to a rod. This, too, utilizes a spring element that has been found to fail after only a reasonable use time. For example, one trucking firm that utilizes such a unit has found that the average life of the load securing device is about ninety days. As will be understood, usage by a trucking firm imposes conditions of large vibrations, truck wall deformation, rough handling by users, etc., that contribute to early failure.

Accordingly, it is an object of the present invention to provide a rugged load securing device for holding loads in place within transport trucks.

It is another object of the present invention to provide a load securing device that has a wide range of final length adjustment after a gross length adjustment is made in the rod itself.

A further object of the present invention is to provide a load securing device that does not utilize springs or other elements of high failure potential such that the life is substantially extended.

Also, an object of the present invention is to provide a load securing device that is simple and inexpensive to construct but provides for extended operation without any maintenance.

These and other objects, advantages and features of the present invention will become apparent upon a consideration of the drawings forming a part hereof, together with a complete description thereof.

DISCLOSURE OF THE INVENTION

In accordance with the present invention, there is provided a rugged load lock that can be adjusted in length over a rather wide range. If the device becomes loose, tightening is easily accomplished. This device can be locked in position until release is desired. Specifically, the present invention utilizes a pair of telescoping rods with wall-engaging pads at the extreme ends. A gross adjustment of the total length is made by sliding the two rods relative to each other, and pinning them together with a releasable pin or the like. The inner of the rods carries a rack-type gear, and the outer rod has a housing for a pinion gear to mate with the rack, together with a latch to prevent rotation of the pinion gear when the device is in place within a truck. A handle is provided to give rise to the rotation of the pinion gear. In the preferred embodiment, braces between the housing and the outer rod provide additional strength and minimize introduction of foreign matter into the gears. No springs are utilized in the fine adjustment portion to reduce maintenance, and the rack gear is sufficiently long such that any "fine" adjustment in length can be made.

BRIEF DESCRIPTION OF THE DRAWINGS

FIG. 1 is a side elevational view of a load lock according to the present invention, a portion of the rods being cut away.

FIG. 2 is a top view of the operating portion of the device of FIG. 1, with the braces removed so as to more clearly show the rack gear.

FIG. 3 is a cross-sectional view of the operating portion of the device taken at 3—3 of FIG. 1.

FIG. 4 is an enlarged cross-sectional view of a portion of FIG. 3 taken at 4 therein.

FIG. 5 is a cross-sectional view of the operating portion of the device taken at 5—5 of FIG. 2.

BEST MODE FOR CARRYING OUT THE INVENTION

A preferred embodiment of the present invention is shown generally at 10 in an overall side elevational view of FIG. 1. Telescoping rods 12, 14 are provided such that a gross adjustment of total length can be made. Preferably, the rods are substantially square hollow channels; however, they can have other cross sectional configurations within the spirit of the present invention. The embodiment described herein utilized steel channels with a wall thickness of 3/32 to ⅛ inch, and the inner rod 14 was about one inch square. The inner bore dimension of the outer rod 12 is such as to slidably receive the inner rod 14. Typically, a spring-loaded pin 16 mounted in a enclosure 18 on the outer rod mates with one of a series of spaced-apart holes, such as at 20, provided in the inner rod 14. Typically, these holes are spaced about 3½ to 4 inches apart, and are about 5/16 inch in diameter. Of course, it will be understood that other types of locking pins can be used to accomplish this adjustable locking of the outer rod 12 relative to the inner rod 14.

A second inner rod 15 is also slidably positioned within the outer rod 12. This second inner rod 15, at its exposed end, is provided with a foot member 22, a portion of which is a resilient pad 24 to provide for nonslip engagement with a truck wall 26. In a similar manner, the first inner rod 14 has a foot member 28, including a resilient pad 30, for non-slip engagement with the opposite truck wall 32. These foot members 22, 28 are typically attached to their respective rods 15, 14 with bolts, as indicated at 34, 36, respectively. Of course, other fastening elements can be used, or the foot members can be welded to their respective rods if desired.

Intermediate the two foot members 22, 28 is an operating mechanism 38. Although shown generally adjacent foot member 22, this operating mechanism 38 can be located at any selected position along the outer rod 12. This operating mechanism 38 includes a housing 40 for the mounting of components associated with the outer rod 12. In this FIG. 1 the operating components are a handle 42, a toothed wheel 44, and a pawl 46 for engagement with the wheel 44, but which is mounted to the housing 40 with a pivot (bolt) 47 such that the pawl 46 can be moved selectively into and out of engagement with the wheel 44. In a preferred embodiment, the pawl 46 is pivoted at the pivot 47 such that the pawl will normally be disengaged from the toothed wheel 44 by action of gravity. Also shown is the rack (a toothed bar) 48 forming a portion of a rack-and-pinion mechanism, described in greater detail hereinafter, that is mounted on the inner rod 15 (see FIGS. 3, 4 and 5). In the preferred embodiment, additional rigidity of the housing 40 is provided with braces 50, 52 attached between upper corners of the housing 40 and the outer rod 12. Alternatively, a single bar can form the two braces 50, 52, with this bar being fastened across the top of the housing as seen in FIG. 5.

A top view of the operating mechanism 38 is shown in FIG. 2. It will be understood that the braces 50, 52 are not shown such that a top view of the toothed bar 48 can be seen. From this view, and that of FIG. 3, the handle 42 is depicted as a double-ended bar that passes through an open cylindrical sleeve 54 mounted concentrically with the toothed wheel 44. It will be understood that other forms of handles to rotate an axle 56 upon which the toothed wheel 44 is mounted, can be used in the present invention.

A further detail of the operating mechanism 38 is shown in FIG. 3 which is a cross-sectional view taken at 3—3 of FIG. 1. As previously identified, the handle 42 passes through a cylindrical sleeve 54 in this embodiment. In addition to this sleeve 54 and the toothed wheel 44, the axle 56 carries a pinion gear 58 that engages the toothed bar 48. A washer 60, or other suitable means, is secured to the end of the axle 56 to prevent removal from the housing 40. By reason of this construction, rotation of the handle 42 causes rotation of the axle 56, the pinion gear 58 and the toothed wheel 44. This results in axial movement of the toothed bar 48 with the accompanying axial movement of the inner rod 15.

A portion of FIG. 3 is enlarged and shown as FIG. 4. From this enlargement it can be seen that in this embodiment the housing 40 is attached to the outer rod 12 as by welding at 62. Of course, other means for fastening the housing 40 to the rod 12 can be utilized in the present invention. Further, the toothed bar 48, which is mounted to the inner rod 15 by any suitable means, projects through an axially-oriented opening or slot in the outer rod 12 so as to be engaged by the pinion gear 58.

A longitudinal cross section of the device is shown in FIG. 5. It will be apparent from this FIG. 5 that, as the axle 56 is rotated in a selected direction, the pinion gear 58 is also rotated as indicated by the double-ended arrow 66. Through the meshing of the pinion gear 58 with the toothed bar 48, the second inner rod 15 is moved axially as indicated by the double-ended arrow 68. The length of the toothed bar 48 is sufficient such that the pinion 58 can be rotated approximately one full revolution such that a wide range of length adjustment of the present invention 10 is available.

In one preferred embodiment the circumference of the pinion gear 58 and the length of the toothed bar (rack) 48 provide for a travel of about six inches. Thus, the amount of travel is at least as great as the spacing between the openings 20. Of course, other travel lengths can be used such that the travel is about equal to, or greater than, this spacing.

In a normal utilization of the present invention in transport trucks, cargo is placed into the truck to a selected position, beginning at a forward end. One or more of the devices of the present invention are then utilized to maintain the cargo against shifting due to acceleration, deceleration, wall deformation or vibration. To install each of the devices, a gross length that is slightly less than the width of the interior of the truck is selected through the use of the spring-loaded pin 16 in an appropriate opening 20 of the inner rod 14. Final adjustment of length is then made by rotating the handle 42 in a clock-wise direction as viewed in FIG. 1, This extends the second inner rod 15 and the foot member 22 associated therewith until the resilient members 24, and 30 are firmly engaged with opposite walls 26, 32 of the truck. The pawl 46 is then engaged with a notch of the notched wheel 44 and, thus the device will remain in position within the truck. If some loosening should occur, further rotation of the handle 42 will re-tighten the ends against the truck walls. When any cargo is to be removed, the device 10 can be removed. This is accomplished by disengaging the pawl 46 from the toothed wheel 44 such that the handle can be rotated in a counter-clockwise direction (in FIG. 1) to shorten the total length of the device 10. After repositioning any cargo, if necessary, the device 10 is replaced. Since there are no springs to wear or break, and since a wide range of length adjustment is available, the present device 10 will withstand extensive use.

From the foregoing, it will be recognized that a rugged and very useful load locking device for holding cargo has been developed. Although certain sizes and configurations are given herein, these are for illustration only and not for the purpose of limiting the present invention. Rather, the invention is to be limited only by the appended claims and their equivalents.

I claim:

1. A load securing device for holding cargo within a truck from shifting of the cargo within the truck, said load securing device comprising:

a primary rod having first and second ends and provided with a bore from said first end to said second end of said primary rod, said primary rod provided with a slot parallel to an axis of said primary rod and extending to said bore;

a first adjustment rod having a first end and a second end, said first end slidably received in said bore of said primary rod at said first end of said primary rod;

a foot member attached to said second end of said first adjustment rod for engagement with a wall of the truck;

a second adjustment rod having a first end and a second end, said first end slidably received in said bore of said primary rod at said second end of said primary rod so as to be axially aligned with said first adjustment rod;

a second foot member attached to said second end of said second adjustment rod for engagement with an opposite wall of the truck;

a toothed bar fixedly attached to said second adjustment rod and aligned along an axis of said second adjustment rod, said toothed bar having gear teeth projecting through said slot of said primary rod, said slot having a length greater than a length of said toothed bar;

a housing attached to one side of said primary rod so as to be aligned with said slot;

a pinion gear mounted on an axle for rotation with said axle, said axle journaled in said housing, said pinion gear having gear teeth continuously engaged with said gear teeth of said toothed bar;

a handle engaged with said axle for rotating said axle and said pinion gear;

a toothed wheel carried by said axle for rotation with said axle;

a pawl member pivotally mounted on said housing, said pawl member engageable with said toothed wheel to prevent rotation of said axle in one direction but permit rotation in an opposite direction;

whereby rotation of said pinion gear against said toothed bar moves said toothed bar axially within said slot to effect a change in length of said device from said first foot member to said second foot member.

2. The device of claim 1 wherein said first adjustment rod is provided with spaced-apart openings along a length between said first and second ends of said first adjustment rod, said device further comprising a releasable detent member mounted on said primary rod and extending into said bore to selectable engage one of said spaced-apart openings.

3. The device of claim 2 wherein said releasable detent member is a spring-loaded pin mounted in an enclosure on said primary rod.

4. The device of claim 2 wherein said pinion gear, said toothed bar and said slot in said primary rod provide said change in length at least as great as a distance between said spaced-apart openings in said first adjustment rod.

5. The device of claim 1 wherein each of said feet members includes a resilient pad to frictionally engaged said walls of said truck.

6. The device of claim 1 further comprising angularly oriented brace members having one end attached to said housing and a second end attached to said primary rod to strengthen said housing during tightening said foot members against the truck walls and minimize introduction of foreign material into said toothed bar and pinion gear.

7. The device of claim 1 wherein said pawl member pivotally mounted upon said housing is configured whereby said pawl member is normally disengaged from said toothed wheel by the effect of gravity upon said pawl member.

8. The device of claim 1 wherein said handle comprises:

a cylindrical member attached to said toothed wheel, said cylindrical member having an axis aligned with said axle; and a handle rod passing through and extending beyond an outer end of said cylindrical member, said handle rod to be grasped by a user to rotate said axle.

9. The device of claim 1 wherein:

said primary rod has a square cross section with a bore having a square cross section;

said first adjusting rod has a square cross section to be slidably received within said bore of said primary rod; and said second adjusting rod has a square cross section to be slidably received within said bore of said primary rod.

10. The device of claim 1 wherein said first and second adjusting rods are provided with bores from said first ends to said second ends of each, respectively.

11. A load securing device for holding cargo within a truck from shifting of the cargo within the truck, said load securing device comprising:

a primary rod having first and second ends and provided with a bore from said first end to said second end of said primary rod, said primary rod provided with a slot parallel to an axis of said primary rod and extending to said bore;

a first adjustment rod having a first end and a second end, said first end slidably received in said bore of said primary rod at said first end of said primary rod, said first adjustment rod provided with spaced-apart openings along a length from proximate said first end to proximate said second end of said first adjustment rod;

a first foot member attached to said second end of said first adjustment rod, said first foot member having a resilient pad for engagement with a wall of the truck;

an enclosure mounted on said primary rod proximate said first end of said primary rod;

a spring-loaded pin mounted in said enclosure, said pin for engagement with a selected one of said spaced-apart openings in said first adjustment rod;

a second adjustment rod having a first end and a second end, said first end slidably received in said bore of said primary rod at said second end of said primary rod so as to be axially aligned with said first adjustment rod;

a second foot member attached to said second end of said second adjustment rod, said second foot member provided with a resilient pad for engagement with an opposite wall of the truck;

a toothed bar fixedly attached to said second adjustment rod and aligned along an axis of said second adjustment rod, said toothed bar having gear teeth projecting through said slot of said primary rod, said slot having a length greater than a length of said toothed bar;

a housing attached to one side of said primary rod so as to be aligned with said slot;

a pinion gear mounted on an axle for rotation with said axle, said axle journaled in said housing, said pinion gear having gear teeth continuously engaged with said gear teeth of said toothed bar;

a handle connected to said axle for rotating said axle and said pinion gear through proximate three hundred sixty degrees;

a toothed wheel carried by said axle for rotation with said axle;

a pawl member pivotally mounted on said housing, said pawl member engageable with said toothed wheel to prevent rotation of said axle in one direction but permit rotation in an opposite direction, said pawl member configured whereby said pawl member is normally disengaged with said toothed wheel by effects of gravity;

whereby rotation of said pinion gear against said toothed bar moves said toothed bar axially within said slot to effect a change in length of said device from said first foot member to said second foot member.

12. The device of claim 11 wherein said pinion gear, said toothed bar and said slot in said primary rod provide said change in length at least as great as a distance between said spaced-apart openings in said first adjustment rod.

13. The device of claim 11 further comprising angularly oriented brace members having a first end attached to said housing and a second end attached to said primary rod to strengthen said housing during tightening said resilient pads of said foot members against the truck walls and minimize introduction of foreign material into said toothed bar and pinion gear.

14. The device of claim 11 wherein said handle comprises:

a cylindrical member attached to said toothed wheel, said cylindrical member having an axis aligned with said axle; and a handle rod passing through, and extending beyond an outer end of, said cylindrical member, said handle rod to be grasped by a user to rotate said axle.

15. The device of claim 11 wherein:

said primary rod has a square cross section with a bore having a square cross section;

said first adjusting rod has a square cross section to be slidably received within said bore of said primary rod; and said second adjusting rod has a square cross section to be slidably received within said bore of said primary rod.

16. A load securing device for holding cargo within a truck from shifting of the cargo within the truck, said load securing device comprising:

a square cross-section primary rod having first and second ends and provided with a bore of square cross section from said first end to said second end of said primary rod, said primary rod provided with a slot parallel to an axis of said primary rod and extending to said bore;

a first square cross-section adjustment rod having a first end and a second end, said first end slidably received in said bore of said primary rod at said first end of said primary rod said first adjustment rod provided with spaced-apart openings along a length from proximate said first end to proximate said second end of said first adjustment rod;

a first foot member attached to said second end of said first adjustment rod, said first foot member having a resilient pad for engagement with a wall of the truck;

an enclosure mounted on said primary rod proximate said first end;

a spring-loaded pin mounted in said enclosure, said pin for engagement with a selected one of said spaced-apart openings in said first adjustment rod;

a second square cross-section adjustment rod having a first end and a second end, said first end slidably received in said bore of said primary rod at said second end of said primary rod so as to be axially aligned with said first adjustment rod;

a second foot member attached to said second end of said second adjustment rod, said second foot member provided with a resilient pad for engagement with an opposite wall of the truck;

a toothed bar fixedly attached to said second adjustment rod and aligned along an axis of said second adjustment rod, said toothed bar having gear teeth projecting through said slot of said primary rod, said slot having a length greater than a length of said toothed bar;

a housing attached on one side of said primary rod so as to be aligned with said slot;

angularly oriented brace members having one end attached to said housing and a second end attached to said primary rod to strengthen said housing during tightening said resilient pads of said foot members against the truck walls and minimize introduction of foreign material into said gear teeth of said toothed bar;

a pinion gear mounted on an axle so as to rotate with said axle, said axle journaled in said housing, said pinion gear having gear teeth continuously engaged with said gear teeth of said toothed bar;

a toothed wheel carried by said axle for rotation with said axle;

a pawl member pivotally mounted on said housing, said pawl member engageable with said toothed wheel to prevent rotation of said axle in one direction but permit rotation in an opposite direction, said pawl member configured whereby said pawl member is normally disengaged with said toothed wheel by effects of gravity;

a cylindrical member attached to said toothed wheel, said cylindrical member having an axis aligned with said axle;

a handle passing through and extending beyond an outer end of said cylindrical member for rotating said axle and said pinion gear through proximate three hundred sixty degrees;

whereby rotation of said pinion gear against said toothed bar moves said toothed bar axially within said slot to effect a change in length of said device from said first foot member to said second foot member, said change in length being at least as great as a spacing between said openings in said first adjustment rod.

* * * * *